United States Patent
Wang

(10) Patent No.: US 8,930,725 B2
(45) Date of Patent: Jan. 6, 2015

(54) SERVER RACK SYSTEM FOR MANAGING POWER SUPPLY

(75) Inventor: Hao-Hao Wang, Shanghai (CN)

(73) Assignee: Inventec Corporation, Taipei (TW)

( * ) Notice: Subject to any disclaimer, the term of this patent is extended or adjusted under 35 U.S.C. 154(b) by 464 days.

(21) Appl. No.: 13/413,330

(22) Filed: Mar. 6, 2012

(65) Prior Publication Data

US 2013/0138980 A1    May 30, 2013

(30) Foreign Application Priority Data

Nov. 28, 2011  (CN) .......................... 2011 1 0384135

(51) Int. Cl.
  *G06F 1/00* (2006.01)
  *G06F 1/26* (2006.01)
(52) U.S. Cl.
  USPC ............ 713/300; 713/310; 713/320; 713/340
(58) Field of Classification Search
  USPC .................. 713/300, 310, 320, 340
  See application file for complete search history.

(56) References Cited

U.S. PATENT DOCUMENTS

| | | | |
|---|---|---|---|
| 8,006,108 B2* | 8/2011 | Brey et al. ...................... | 713/320 |
| 2003/0033547 A1* | 2/2003 | Larson et al. ................. | 713/300 |
| 2005/0015632 A1* | 1/2005 | Chheda et al. ................ | 713/300 |
| 2008/0222435 A1* | 9/2008 | Bolan et al. ................... | 713/310 |
| 2009/0031153 A1* | 1/2009 | Bahali et al. .................. | 713/310 |
| 2009/0055665 A1* | 2/2009 | Maglione et al. ............. | 713/320 |
| 2011/0035611 A1* | 2/2011 | Brey et al. ..................... | 713/320 |
| 2012/0089713 A1* | 4/2012 | Carriere ........................ | 709/222 |
| 2012/0124568 A1* | 5/2012 | Fallon et al. .................. | 717/169 |
| 2012/0137148 A1* | 5/2012 | He et al. ........................ | 713/310 |
| 2012/0166825 A1* | 6/2012 | Blackburn .................... | 713/310 |
| 2013/0073882 A1* | 3/2013 | Inbaraj et al. ................. | 713/320 |

* cited by examiner

*Primary Examiner* — Zahid Choudhury
(74) *Attorney, Agent, or Firm* — CKC & Partners Co., Ltd.

(57) ABSTRACT

A server rack system for managing power supply is provided. The system includes: a first LAN switch, a plurality of servers, at least one power supply unit, and an IMM. The first LAN switch is coupled to a management network. Each of the servers has a BMC. The BMC has a management network port connected to the management network. The power supply unit supplies electric power to the server rack system and has a management network port connected to the management network. The IMM has a management network port connected to the management network, visits the BMCs through the management network to acquire a power consumption value of the servers, generates a control command according to the power consumption value of the servers, and transmits the control command through the management network to the power supply unit. The power supply unit adjusts electric power output according to the control command.

11 Claims, 4 Drawing Sheets

SERVER RACK SYSTEM FOR MANAGING POWER SUPPLY

CROSS-REFERENCE TO RELATED APPLICATION

This application claims the priority benefit of China application serial no. 201110384135.9, filed on Nov. 28, 2011. The entirety of the above-mentioned patent application is hereby incorporated by reference herein and made a part of this specification.

BACKGROUND OF THE INVENTION

1. Field of the Invention

The present invention generally relates to a server rack system, in particular, to a server rack system for managing power supply.

2. Description of Related Art

A server has high computing capacity, and is thus used as a core computer that serves the other computers in a network system. The server, functioning as the core computer that serves the other computers in the network system, is capable of providing functions such as a magnetic disk and a printing service required by a network user, and is also capable of enabling clients to share with each other various resources within the network environment.

The servers are generally classified, according to their appearances, into three types, including a pedestal server, a rack server and a blade server. The rack server is a pedestal server that is optimized in structure, and designed to reduce an occupied space of the server. The width of the rack server is usually 19 inches, and the height thereof is measured with a unit U (1 U=1.75 inches). Taking a server rack for example, the server rack is a server with its appearance designed according to a uniform standard, and is used in combination with a cabinet. In other words, the rack server is a tower server that is optimized in structure, and mainly designed to reduce an occupied space of the server as much as possible. Many professional network apparatuses adopt the rack type structure, and are mostly in a flat shape like a drawer, such as a switch, a router, and a hardware firewall. The width of the server rack is 19 inches, and the height thereof is measured with a unit U (1 U=1.75 inches=44.45 millimeters). Usually, there are servers in standards of 1 U, 2 U, 3 U, 4 U, 5 U, and 7 U.

The basic architecture of a server is generally the same as a personal computer, which includes components such as a central processing unit (CPU), a memory, and an input/output device. The components are connected through buses within the server, and are connected through a north bridge chip to the CPU and the memory and connected through a south bridge chip to the input/output device. However, sufficient electric power supply is required in order to enable all the components to work normally. When an error occurs in the configuration of a power supply unit (PSU) that is in charge of electric power supply in the server, the quality of the server is affected, and circumstances such as difficulty in startup, a set value error, or system unsteadiness may occur.

Generally speaking, for server units located in a rack (such as the switch, the router, and the hardware firewall), cables are generally used to connect each server unit and a power supply module, so that the power supply module provides desired electric power for each server unit. However, in this case, an extra space is required in the rack to place the cables and allow the cables to move accordingly with the cabinet when the server unit is drawn out. Thereby, it is easy to cause poor space allocation and utilization rate in the rack. In addition, with the increasing of the number of the server units, the number of the cables increases accordingly, and the disarrangement of the cables may hinder the operation of a user.

Furthermore, the servers are usually placed in special machine rooms, and power control and management is required to be performed in a remote manner, so that the PSU must have a remote management function. In other words, the PSU needs to use a network power. However, the use of the network power leads to the problem of unsteadiness of the network power and causes dramatic increase of the hardware cost.

SUMMARY OF THE INVENTION

Accordingly, the present invention is directed to a server rack system for managing power supply, which is capable of more effectively adjusting electric power output according to a power consumption value of a server.

The present invention provides a server rack system, which includes: a first local area network (LAN) switch, a plurality of servers, at least one power supply unit, and an integrated management module (IMM). The first LAN switch is coupled to a management network. Each of the servers has a board management controller (BMC), and each of the BMCs has a management network port connected to the management network. The power supply unit is used for supplying electric power to the server rack system, and has a management network port connected to the management network. The IMM has a management network port connected to the management network, and visits the BMCs through the management network to acquire a power consumption value of the servers. The IMM generates a control command according to the power consumption value of the servers, the IMM transmits the control command through the management network to the power supply unit, and the power supply unit adjusts electric power output according to the control command.

In an embodiment of the present invention, the power supply unit at least includes: at least one power supply device and a power controller. The power controller is coupled to the at least one power supply device, and has a management network port connected to the first LAN switch. The IMM communicates through the management network with the power controller, and controls the at least one power supply device through the power controller.

In an embodiment of the present invention, the power controller is coupled through a power lead to the at least one power supply device, and is electrically connected to the plurality of servers so as to provide electric power for the servers.

In an embodiment of the present invention, the power controller gathers and stores, through a power management bus, power supply information individually generated by the at least one power supply device, and the IMM visits the power controller through the first LAN switch to acquire the power supply information stored in the power controller.

In an embodiment of the present invention, the IMM delivers a control command through the first LAN switch to the power controller, and the power controller controls the at least one power supply device through a common input/output interface according to the control command.

In an embodiment of the present invention, the IMM controls the power controller to turn on or off at least one of the power supply devices through the common input/output interface, so as to control an output power of the power supply unit.

In an embodiment of the present invention, the IMM visits the power controller through the first LAN switch to specify a working mode of the power controller.

In an embodiment of the present invention, the IMM acquires a firmware version number of the power supply unit through the first LAN switch to judge whether the firmware is a latest version, and if not, updates the firmware of the power supply unit.

In an embodiment of the present invention, the IMM stores a firmware of the latest version of the power supply unit, and when the firmware of the power supply unit is not in the latest version, the IMM updates the firmware of the latest version to the power supply unit through the first LAN switch.

In an embodiment of the present invention, the first LAN switch has a plurality of LAN ports. The LAN ports of the first LAN switch are connected, according to a port device location table, to the servers or the power supply unit located at corresponding positions. The IMM acquires the positions of the servers or the power supply unit in the rack according to the port device location table.

In an embodiment of the present invention, the power supply unit has a media assess control (MAC) address. The IMM stores an asset mapping table, and the asset mapping table stores a corresponding relation between an asset number and the MAC address of the power supply unit or an MAC address of the BMC of the server. The IMM acquires, through the first LAN switch, the MAC address of the power supply unit or the BMC of the server, and queries the asset mapping table according to the acquired MAC address so as to obtain the corresponding asset number.

In an embodiment of the present invention, the IMM is further connected, through the management network, to a remote management station, so that a user is enabled to control, through the remote management station, the IMM to manage the servers and the power supply unit.

In an embodiment of the present invention, each of the servers has a service network port. The server rack system further includes a second LAN switch connected to the service network ports of the servers. The servers provide services through the second LAN switch to a service internet.

Based on the above, the present invention provides a server rack system for managing power supply. A power controller of the server rack system is coupled to all power supply devices. An IMM visits the power controller through an LAN switch and a management network to acquire a power consumption value of the servers, and generates a control command according to the power consumption value of the servers. Subsequently, the IMM transmits the control command through the management network to a power supply unit. The power supply unit adjusts electric power output according to the control command. Therefore, under a condition that the power supply device does not use a network power, the aim of effectively managing and maintaining each of the power supply devices through a network without increasing the hardware cost is achieved.

BRIEF DESCRIPTION OF THE DRAWINGS

In order to make the above objectives, features and advantages of the present invention more comprehensible, the specific implementation of the present invention is described in detail below with reference to the accompanying drawings.

DESCRIPTION OF THE EMBODIMENTS

Figure 1A:
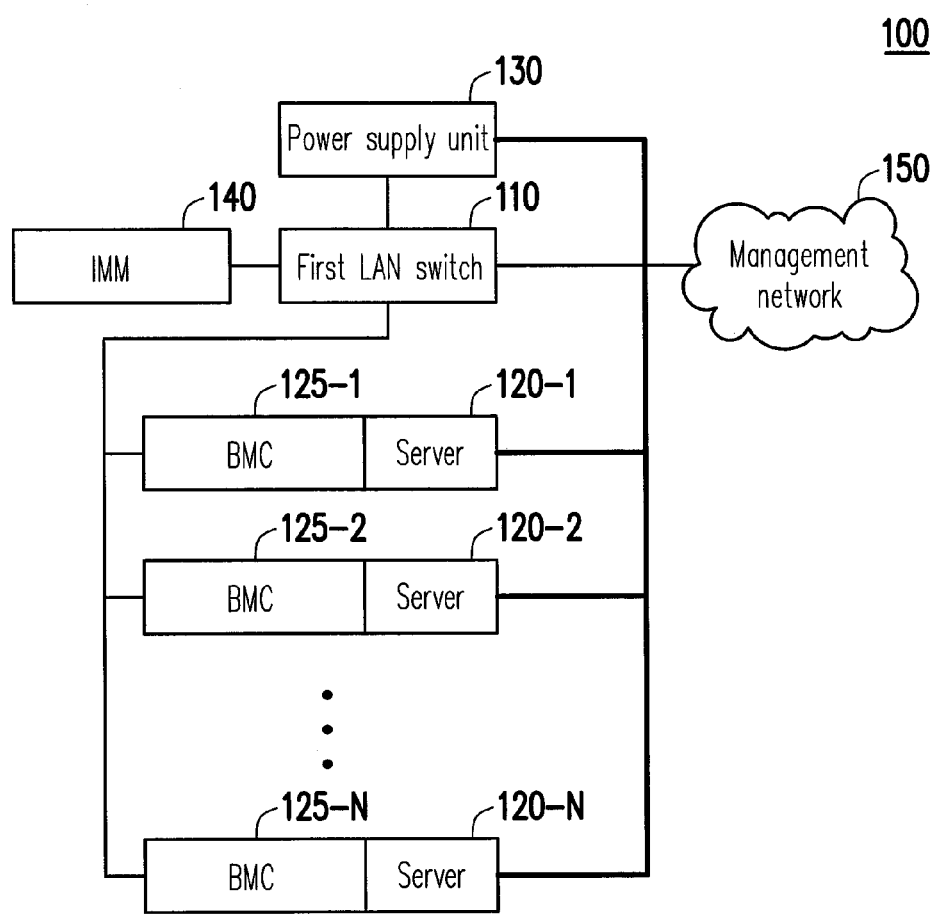
FIG. 1A is a functional block diagram of a server rack system for managing power supply according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

FIG. 1A is a functional block diagram of a server rack system for managing power supply according to an embodiment of the present invention. The server rack system 100 includes a first LAN switch 110, servers 120-1 to 120-N, BMCs 125-1 to 125-N, a power supply unit 130, an IMM 140 and a management network 150, where N is a positive integer greater than 1. The first LAN switch 110 is coupled to the management network 150. The management network 150 is an internal network provided for a server administrator to manage and control the servers 120-1 to 120-N. The servers 120-1 to 120-N respectively have BMCs 125-1 to 125-N. Each of the BMCs 125-1 to 125-N has a management network port connected to the management network 150. The power supply unit 130 supplies electric power to the server rack system 100. The power supply unit 130 also has a management network port connected to the management network 150. The IMM 140 visits the BMCs 125-1 to 125-N through the management network 150 to acquire a power consumption value of the servers 120-1 to 120-N.

Further, in this embodiment, the server rack system 100 uses the first LAN switch 110 as an internal connection unit, so that the IMM 140 is coupled through the first LAN switch 110 to the power supply unit 130, the BMCs 125-1 to 125-N and the other devices in the rack that are connected to the management network 150.

Figure 2:
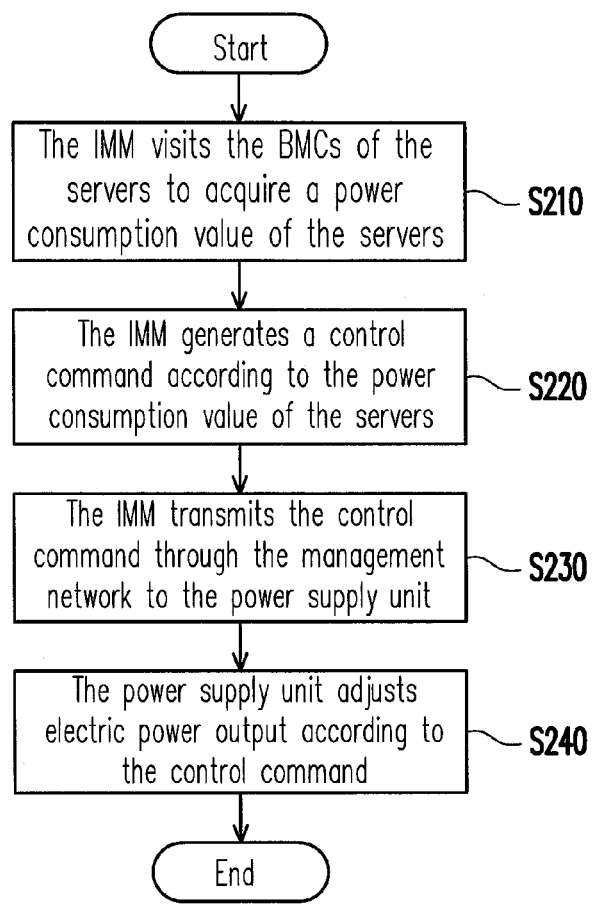
FIG. 2 is a flowchart of a method for operating a server rack system for managing power supply according to an embodiment of the present invention.

FIG. 2 is a flowchart of a method for operating a server rack system for managing power supply according to an embodiment of the present invention. Referring to FIG. 1A and FIG. 2 at the same time, the IMM 140 visits the BMCs 125-1 to 125-N of the servers 120-1 to 120-N to acquire a power consumption value of the servers 120-1 to 120-N (Step S210). Then, the IMM 140 generates a control command according to the power consumption value of the servers 120-1 to 120-N (Step S220).

In the other embodiments of the present invention, the server rack system 100 may further include other devices such as a fan control unit. The IMM 140 visits the device through the management network 150 to acquire a power consumption value thereof, and adjusts, in combination with the power consumption value of the servers 120-1 to 120-N, electric power output of the power supply unit 130.

After Step S220, the IMM 140 transmits the control command through the management network 150 to the power supply unit 130 (Step S230). The power supply unit 130 adjusts electric power output of the server rack system 100 according to the control command (Step S240).

In the other embodiments of the present invention, the IMM 140 acquires a firmware version number of the power supply unit 130 through the first LAN switch 110 to judge whether a current firmware is in a latest version, and if not, updates the firmware of the power supply unit 130.

In the other embodiments of the present invention, the IMM 140 stores a firmware of a latest version of the power supply unit 130. When the firmware of the power supply unit 130 is not in the latest version, the IMM 140 updates the firmware of the latest version to the power supply unit 130 through the first LAN switch 110.

In the other embodiments of the present invention, the first LAN switch 110 has a plurality of LAN ports. The LAN ports of the first LAN switch 110 are connected, according to a port device location table, to the servers 120-1 to 120-N or the power supply unit 130 located at corresponding positions. The IMM 140 acquires the positions of the servers 120-1 to 120-N or the power supply unit 130 in the server rack 100 according to the port device location table.

In the other embodiments of the present invention, a power controller 132 of the power supply unit 130 has an MAC address. The IMM 140 stores an asset mapping table. The asset mapping table stores a corresponding relation between an asset number and the MAC address of the power controller 132 or an MAC address of each of the BMCs 125-1 to 125-N of the servers 120-1 to 120-N. The IMM 140 acquires, through the first LAN switch 110, the MAC address of the power controller 132 or each of the BMCs 125-1 to 125-N of the servers 120-1 to 120-N, and queries the asset mapping table according to the acquired MAC address so as to obtain the corresponding asset number.

In the other embodiments of the present invention, the IMM 140 is further connected, through the first LAN switch 110 and the management network 150, to a remote management station, so that a user is enabled to control, through the remote management station, the IMM 140 to manage the servers 120-1 to 120-N and the power supply unit 130.

Figure 1B:
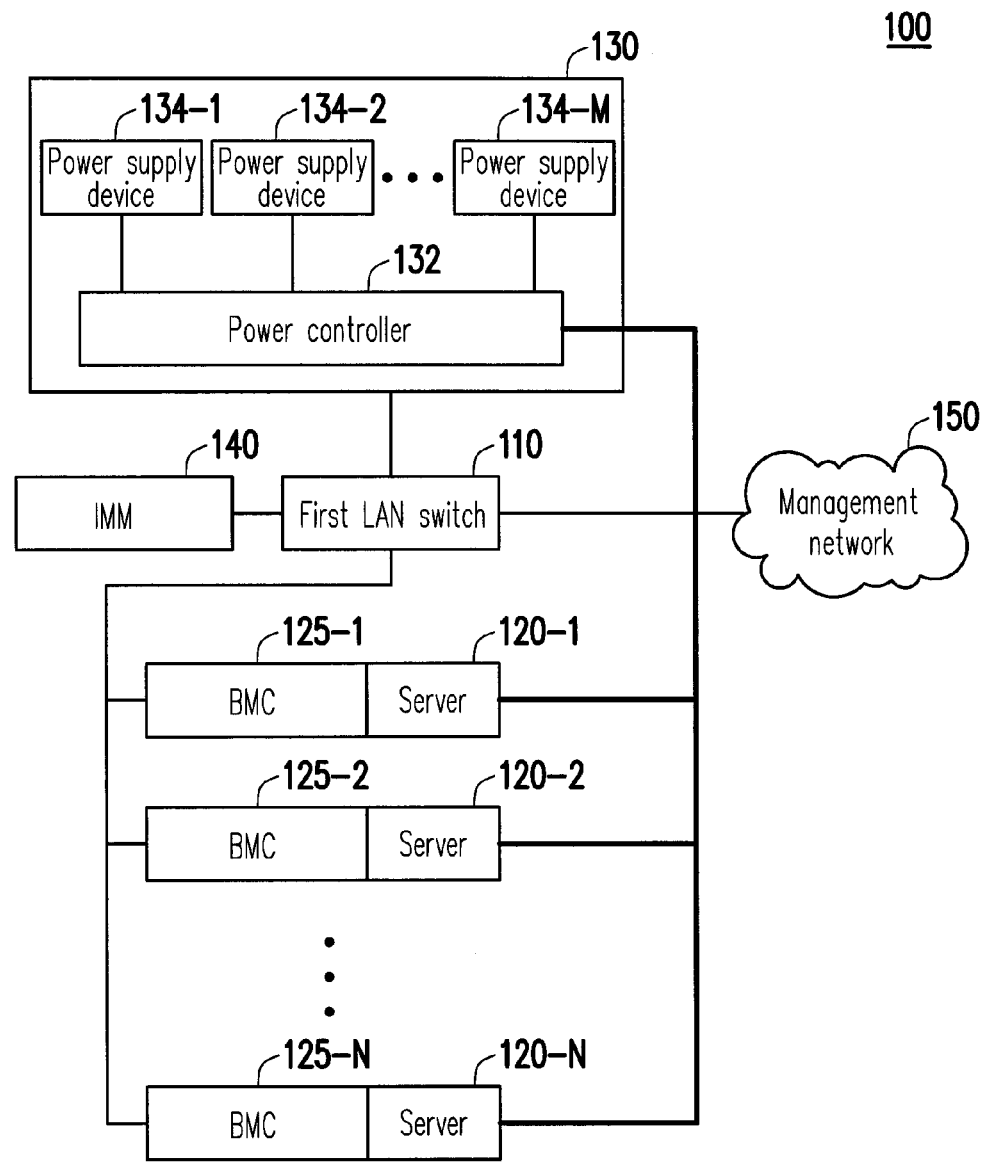
FIG. 1B is a functional block diagram of a server rack system for managing power supply according to another embodiment of the present invention.

FIG. 1B is a functional block diagram of a server rack system for managing power supply according to another embodiment of the present invention. In FIG. 1B, the power supply unit 130 includes the power controller 132 and power supply devices 134-1 to 134-M, where M is a positive integer greater than 1. The power supply devices 134-1 to 134-M are coupled to the power controller 132. The power controller 132 has a management network port connected to the first LAN switch 110 and the management network 150. The IMM 140 communicates through the management network 150 with the power controller 132, and controls the power supply devices 134-1 to 134-M through the power controller 132. Further, the power controller 132 is coupled through power leads to the power supply devices 134-1 to 134-M. The power controller 132 is electrically connected to the servers 120-1 to 120-N so as to supply electric power to the servers 120-1 to 120-N.

In the other embodiments of the present invention, the power controller 132 gathers and stores, through a power management bus, power supply information individually generated by the power supply devices 134-1 to 134-M. The IMM 140 visits the power controller 132 through the first LAN switch 110 to acquire the power supply information stored in the power controller 132.

In the other embodiments of the present invention, the IMM 140 delivers a control command through the first LAN switch 110 to the power controller 132. The power controller 132 controls the power supply devices 134-1 to 134-M through a common input/output interface according to the control command.

In the other embodiments of the present invention, the IMM 140 controls the power controller 132 to turn on or off at least one of the power supply devices 134-1 to 134-M through the common input/output interface, so as to control an output power of the power supply unit 130.

In the other embodiments of the present invention, the IMM 140 visits the power controller 132 through the management network 150 and the first LAN switch 110 to specify a working mode of the power controller 132. For example, when the power controller 132 is in a manual control working mode, a user may deliver a working parameter setting and working command to the power controller 132 through the IMM 140. Or, when the power controller 132 is in an automatic control working mode, the power controller 132 may automatically calculate and adjust its working state, so as to immediately and rapidly respond to a power supply requirement.

Figure 1C:
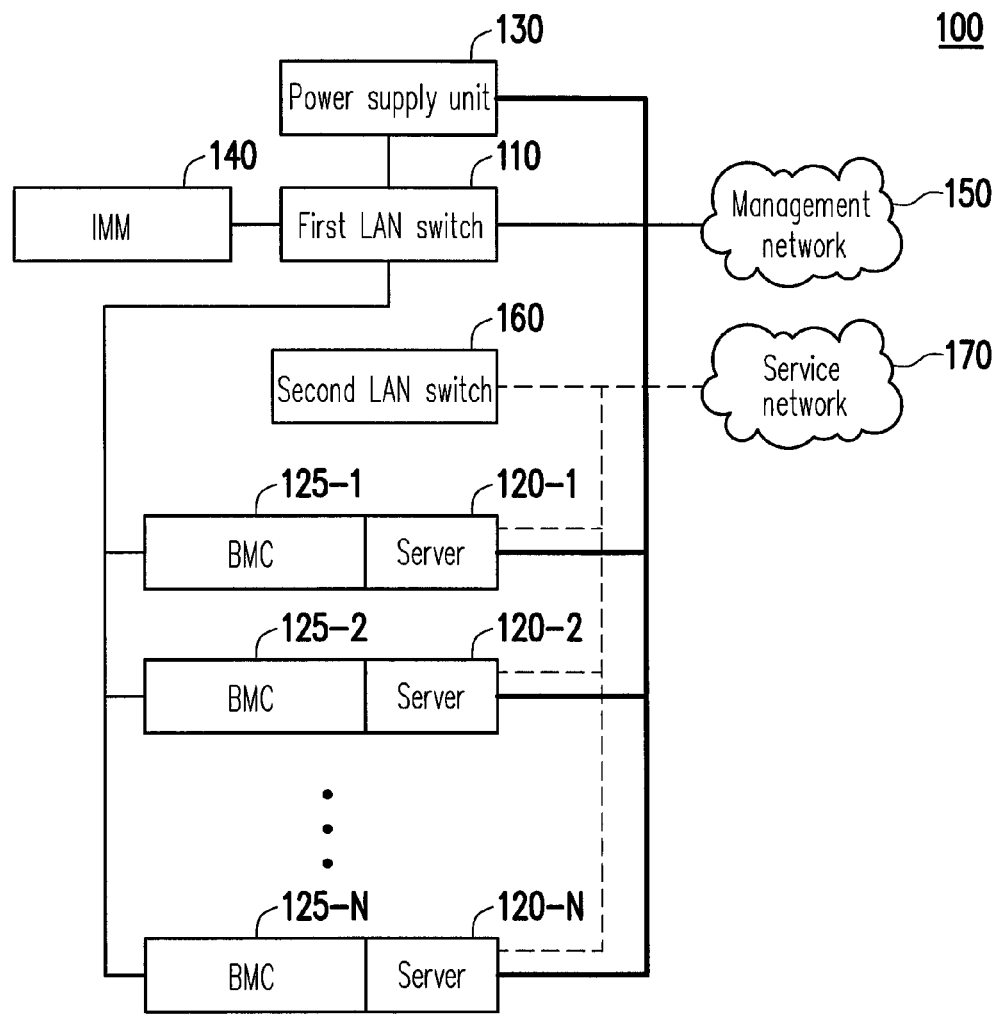
FIG. 1C is still a functional block diagram of a server rack system for managing power supply according to another embodiment of the present invention.

FIG. 1C is still a functional block diagram of a server rack system for managing power supply according to another embodiment of the present invention. The embodiment as described in FIG. 1C further includes a second LAN switch 160. Each of the servers 120-1 to 120-N has a service network port. A service network 170 provides network resources through an Internet service provider (ISP) to ordinary users. The second LAN switch 160 is connected to service network ports of the servers 120-1 to 120-N. The servers 120-1 to 120-N provide services through the second LAN switch 160 to the service network 170, so that a network user is enabled to acquire, through the service network 170, network resources provided by the servers 120-1 to 120-N.

In view of the above, the present invention provides a server rack system for managing power supply. A power controller of the server rack system is coupled to all power supply devices. An IMM visits the power controller through an LAN switch and a management network to acquire a power consumption value of the servers, and generates a control command according to the power consumption value of the servers. Subsequently, the IMM transmits the control command through the management network to a power supply unit. The power supply unit adjusts electric power output according to the control command. Therefore, under a condition that the power supply device does not use a network power, the aim of effectively managing and maintaining each of the power supply devices through a network without increasing the hardware cost is achieved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A server rack system, comprising:
   a first local area network (LAN) switch, coupled to a management network;
   a plurality of servers, each having a board management controller (BMC), wherein each of the BMCs has a management network port connected to the management network;
   at least one power supply unit, for supplying electric power to the server rack system, and having a management network port connected to the management network; and
   an integrated management module (IMM), having a management network port connected to the management network, and used for visiting the BMCs through the management network to acquire a power consumption value of the servers, wherein the IMM generates a control command according to the power consumption value of the servers, the IMM transmits the control command through the management network to the power supply unit, and the power supply unit adjusts electric power output according to the control command, and wherein the at least one power supply unit comprises:

at least one power supply device; and a power controller, coupled to the at least one power supply device, and having a management network port connected to the first LAN switch, wherein the IMM communicates through the management network with the power controller, and controls the at least one power supply device through the power controller, and wherein the power supply unit has a media assess control (MAC) address; the IMM stores an asset mapping table, and the asset mapping table stores a corresponding relation between an asset number and the MAC address of the power supply unit or an MAC address of the BMC of the server; and the IMM acquires the MAC address of the power supply unit or the BMC of the server through the first LAN switch and queries the asset mapping table according to the acquired MAC address so as to obtain the corresponding asset number.

2. The server rack system according to claim 1, wherein the power controller is coupled through a power lead to the at least one power supply device, and is electrically connected to the plurality of servers so as to provide electric power for the servers.

3. The server rack system according to claim 1, wherein the power controller gathers and stores, through a power management bus, power supply information individually generated by the at least one power supply device, and the IMM visits the power controller through the first LAN switch to acquire the power supply information stored in the power controller.

4. The server rack system according to claim 1, wherein the IMM delivers a control command through the first LAN switch to the power controller, and the power controller controls the at least one power supply device through a common input/output interface according to the control command.

5. The server rack system according to claim 4, wherein the IMM controls the power controller to turn on or off at least one of the power supply devices through the common input/output interface, so as to control an output power of the power supply unit.

6. The server rack system according to claim 1, wherein the IMM visits the power controller through the management network and the first LAN switch to specify a working mode of the power controller.

7. The server rack system according to claim 1, wherein the IMM acquires a firmware version number of the power supply unit through the first LAN switch to determine whether the firmware is a latest version, and if not, updates the firmware of the power supply unit.

8. The server rack system according to claim 7, wherein the IMM stores a firmware of the latest version of the power supply unit, and when the firmware of the power supply unit is not in the latest version, the IMM updates the firmware of the latest version to the power supply unit through the first LAN switch.

9. The server rack system according to claim 1, wherein the first LAN switch has a plurality of LAN ports; the LAN ports of the first LAN switch are connected, according to a port device location table, to the servers or the power supply unit located at corresponding positions; and the IMM acquires the positions of the servers or the power supply unit in the rack according to the port device location table.

10. The server rack system according to claim 1, wherein the IMM is further connected to a remote management station through the first LAN switch and the management network, so that a user is enabled to control, through the remote management station, the IMM to manage the servers and the power supply unit.

11. The server rack system according to claim 1, wherein each of the servers has a service network port, and the server rack system further comprises:

a second LAN switch, connected to the service network ports of the servers, wherein the servers provide services through the second LAN switch to a ser vice network.

* * * * *